United States Patent
Tian et al.

(10) Patent No.: US 11,550,818 B2
(45) Date of Patent: Jan. 10, 2023

(54) RETAINING COMMITTED TRANSACTIONS DURING DATABASE CLUSTER REPLICATION

(71) Applicant: International Business Machines Corporation, Armonk, NY (US)

(72) Inventors: Xiao Yi Tian, Beijing (CN); Guoxiang Zhang, Beijing (CN); Xian Wei Zhang, Beijing (CN); XiangXing Shi, Beijing (CN); Peng Hui Jiang, Beijing (CN); Zhang Li, Hai Dian district (CN)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 17/198,322

(22) Filed: Mar. 11, 2021

(65) Prior Publication Data

US 2022/0292112 A1 Sep. 15, 2022

(51) Int. Cl.
| | |
|---|---|
| *G06F 16/00* | (2019.01) |
| *G06F 16/27* | (2019.01) |
| *G06F 11/34* | (2006.01) |
| *G06F 11/14* | (2006.01) |
| *G06F 16/23* | (2019.01) |
| *G06F 16/28* | (2019.01) |

(52) U.S. Cl.
CPC ........ *G06F 16/273* (2019.01); *G06F 11/1425* (2013.01); *G06F 11/3414* (2013.01); *G06F 16/2379* (2019.01); *G06F 16/285* (2019.01)

(58) Field of Classification Search
None
See application file for complete search history.

(56) References Cited

U.S. PATENT DOCUMENTS

| 8,055,943 B2 | 11/2011 | Edel |
| 8,301,593 B2 | 10/2012 | Hoffmann |

(Continued)

OTHER PUBLICATIONS

"Check the Status of a Database High Availability Cluster", vmware, Docs, <https://docs.vmware.com/en/VMware-Cloud-Director/9.7/com.vmware.vcloud.install.doc/GUID-8A5C4488-4F53-4516-8BD9-9F55C69A5C52.html>, Updated Oct. 7, 2020, 2 pages.

(Continued)

*Primary Examiner* — Anhtai V Tran
(74) *Attorney, Agent, or Firm* — Joseph P. Curcuru

(57) ABSTRACT

In an approach to improve asynchronous replication in database clusters embodiments retain committed transactions during database cluster replication. Embodiments build and run asynchronous replication logic using database nodes running as one or more standalone nodes, wherein the asynchronous replication logic is responsible for data replication from a primary database node to one or more secondary database nodes. Embodiments register a replication reader to a sender node to replicate journal logs and replay the journal logs on the one or more secondary database nodes. Further, embodiments monitor replication lag metrics from the sender node and notify a replication source and a replication target of a generated replication plan, wherein the cluster controller instructs the replication source and the replication target to be ready to initiate the replication plan. Additionally, embodiments adjust a replication plan to allow the asynchronous replication logic to catch up and complete uncommitted transactions.

20 Claims, 8 Drawing Sheets

(56) References Cited

U.S. PATENT DOCUMENTS

| | | | | |
|---|---|---|---|---|
| 8,838,919 B2* | 9/2014 | Shi | ..................... | G06F 11/2097 |
| | | | | 707/999.204 |
| 9,639,592 B1 | 5/2017 | Natanzon | | |
| 9,805,108 B2 | 10/2017 | Merriman | | |
| 2014/0279884 A1 | 9/2014 | Dantkale | | |
| 2016/0171070 A1* | 6/2016 | Hrle | ................... | G06F 16/2379 |
| | | | | 707/615 |
| 2020/0092178 A1* | 3/2020 | Nelson | ................. | H04L 41/145 |

OTHER PUBLICATIONS

"Differences between availability modes for an Always On availability group", Microsoft Docs, <https://docs.microsoft.com/en-us/sql/database-engine/availability-groups/windows/availability-modes-always-on-availability-groups?view=sql-server-ver15>, Oct. 16, 2017, 10 pages.

"Replication modes", Docs, <https://patroni.readthedocs.io/en/latest/replication_modes.html>, viewed Jan. 15, 2021, 4 pages.

Mell et al., "The NIST Definition of Cloud Computing", NIST, National Institute of Standards and Technology, Special Publication 800-145, Sep. 2011, 7 pages.

Namuag, Paul, "How to Reduce Replication Lag in Multi-Cloud Deployments", severalnines, <https://severalnines.com/database-blog/how-reduce-replication-lag-multi-cloud-deployments>, Jun. 11, 2020, 8 pages.

Somuncu, Alper, "SAP Hana Ha and DR Series #7: Log Replication Modes", SAP Blogs, <https://blogs sap.com/2017/03/13/sap-hana-ha-and-dr-series-7-log-replication-modes/>, Dec. 4, 2020, 7 pages.

\* cited by examiner

RETAINING COMMITTED TRANSACTIONS DURING DATABASE CLUSTER REPLICATION

BACKGROUND OF THE INVENTION

The present invention relates generally to the field of database cluster replication, and more particularly to preventing the loss of committed transactions in asynchronous replication in database clusters.

Database replication can be used on many database management systems (DBMS), usually with a primary-secondary relationship between the original and the copies. In multi-primary replication, updates can be submitted to any database node, and then ripple through to other servers. Most synchronous replication solutions perform conflict prevention, while asynchronous solutions perform conflict resolution. For instance, if the same record is changed on two nodes simultaneously, a synchronous replication system would detect the conflict before confirming the commit and abort one of the transactions. An asynchronous replication system would allow both transactions to commit and run a conflict resolution during re-synchronization. The resolution of such a conflict may be based on a timestamp of the transaction, on the hierarchy of the origin nodes or on much more complex logic, which decides consistently across all nodes.

Database replication becomes more complex when it scales up horizontally and vertically. Horizontal scale-up has more data replicas, while vertical scale-up has data replicas located at greater physical distances. Problems raised by horizontal scale-up can be alleviated by a multi-layer, multi-view access protocol. The early problems of vertical scale-up have largely been addressed by improving Internet reliability and performance. When data is replicated between database servers, so that the information remains consistent throughout the database system and users are unaware which server in the DBMS they are using, the system is said to exhibit replication transparency. In asynchronous replication, the write operation is considered complete as soon as local storage acknowledges it. Remote storage is updated with a small lag. Performance is greatly increased, but in case of a local storage failure, the remote storage is not guaranteed to have the current copy of data (the most recent data may be lost).

SUMMARY

Embodiments of the present invention disclose a method, a computer program product, and a system for retaining committed transactions during database cluster replication, the computer-implemented method comprising: building and running asynchronous replication logic using database nodes running as one or more standalone nodes, wherein the asynchronous replication logic is responsible for data replication from a primary database node to one or more secondary database nodes; registering a replication reader to a sender node to replicate journal logs and replay the journal logs on the one or more secondary database nodes; monitoring, by a cluster controller, replication lag metrics from the sender node; notifying, by the cluster controller, a replication source and a replication target of a generated replication plan, wherein the cluster controller instructs the replication source and the replication target to be ready to initiate the replication plan; and adjusting, by the cluster controller, a replication plan to allow the asynchronous replication logic to catch up and complete uncommitted transactions.

DETAILED DESCRIPTION

Figure 1:
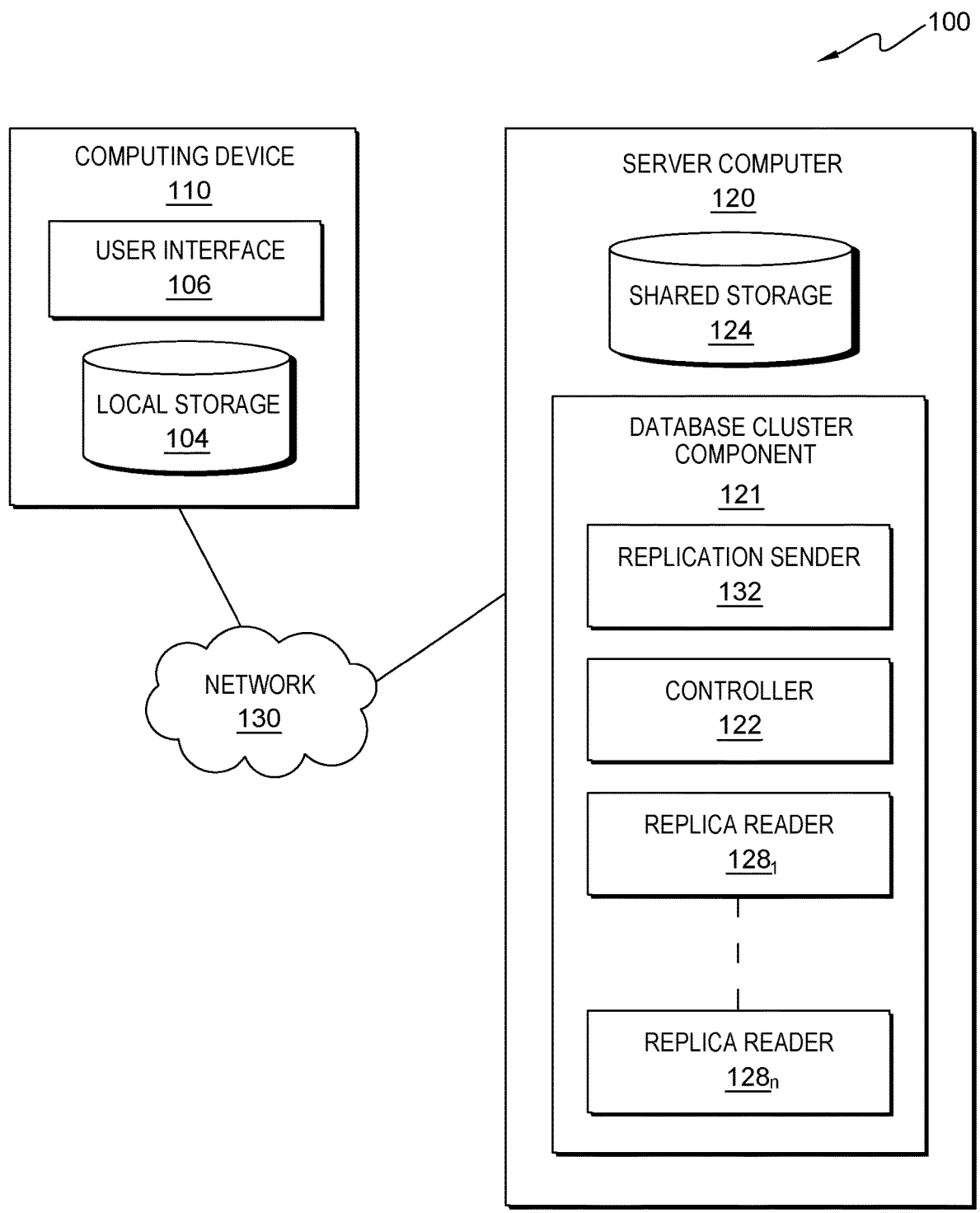
FIG. 1 is a functional block diagram illustrating a distributed data processing environment, in accordance with an embodiment of the present invention.

Embodiments of the present invention recognize that data losses may occur in database clusters during asynchronous replication. Embodiments of the present invention recognize that the loss of data can be troublesome and needs to be solved. Embodiments of the present invention recognize that to achieve database availability and eliminate single points of failure databases are setup as a cluster with multiple nodes. Embodiments of the present invention recognize that, in the art, a typical cluster setup is one primary node and multiple secondary/standby nodes, wherein the primary node will handle all transactions, and replicate data to secondary nodes. Embodiments of the present invention recognize that most databases support two types of replication modes: synchronous and asynchronous; however, both of the replication modes have pros and cons and meet different business requirements. Embodiments of the present invention recognize that asynchronous replication writes data to the primary node first and then, depending on the implementation approach, committed data, in the format of journal log or operations log (oplog), will be copied to secondary nodes in real-time (e.g., streaming) or copied through a scheduler. Embodiments of the present invention recognize that in asynchronous mode the cluster is allowed to lose some committed transactions to ensure availability. Embodiments of the present invention recognize that when the primary server fails or becomes unavailable a healthy standby node will be promoted to be the primary node. In this instance, embodiments of the present invention recognize that any transactions that have not been replicated to that standby remain in a "forked timeline" on the primary, and are effectively unrecoverable. Embodiments of the present invention recognize that the unrecoverable transactions or data is a problem in the art.

Embodiments of the present invention improve the art by separating replication tasks from primary and secondary database nodes and main database processes, into a dedicated cluster of processes. Embodiments of the present invention improve the art by moving asynchronous replication logic out of the database node and running the asynchronous replication as a standalone replica process and as a multi-node replica cluster for availability. Further, embodiments of the present invention improve the art by moving asynchronous replication logic out of the database node, running the asynchronous replication as standalone replica process responsible for data replication from primary database node to secondary database nodes. Embodiments of the present invention deploy replica processes as multi-node replica cluster for high availability (i.e., replica nodes number are no less than the database nodes number). For example, a typical deployment is a set of node machines for running containerized applications cluster running on multiple workers. In various embodiments of the present invention, the replica node has its own roles (e.g., primary, secondary or idle, wherein the replica nodes will elect, in run-time, to associate with one database node. In various embodiments of the present invention, depending on associated database node role, the replica node will execute as a primary or secondary node accordingly.

In various embodiments of the present invention when the primary database node fails or is unavailable, the primary database node's associated replica node is still working as a primary node, to ensure the committed transactions (e.g., in the journal log) are successfully replicated to other secondary replica nodes. In various embodiments of the present invention, the replica node associated with the primary database node turns into an idle node after working as a primary node and successfully replicating the committed transactions to other secondary replica nodes. Concurrently, in various embodiments of the present invention, a secondary node will elect to be the pre-primary node, wherein the pre-primary node will convert into (i.e., act as) a primary node until the committed transactions are replicated. In various embodiments of the present invention, when the database node is in the pre-primary role, the database node can still handle new transactions with a forked journal log, and replay them after replication of previous committed transactions are complete. Embodiments of the present invention improve the art of asynchronous database replication by preventing committed data loss in primary during failover which are caused by primary abnormal shutdown, preventing rollbacks from happening in former primary database nodes during failovers, and moving replication workload from the database workload to prevent the replication process from competing for resources.

Implementation of embodiments of the invention may take a variety of forms, and exemplary implementation details are discussed subsequently with reference to the Figures (i.e., FIG. 1-FIG. 8).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to the automated feedback and component 121. Computing device 110, via user interface 106, may enable a user and/or a client to interact with component 121 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 8. In some embodiments server computer 120 may represent a plurality of server computers.

Each of shared storage 124 and local storage 104 may be a data/knowledge repository and/or a database that may be written and/or read by database cluster component (component) 121, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, shared storage 124 comprises a plurality of databases.

In the depicted embodiment, component 121 is executed on server computer 120. In other embodiments, component 121 may be executed on computing device 110. In various embodiments of the present invention, not depicted in FIG. 1, component 121 may execute on a plurality of server computers 120 and/or on a plurality of computing devices 110. In some embodiments, component 121 may be located and/or executed anywhere within distributed data processing environment 100 as long as component 121 is connected to and/or communicates with, computing device 110, and/or server computer 120, via network 130.

In various embodiments of the present invention, component 121 comprises and executes replication sender node (replication sender) 132, cluster controller (controller) 122, and replica reader $128_1$-$128_n$, wherein n is an integer number representing the number of replica readers in a given embodiment. In other embodiments, replication sender 132, controller 122, and replica reader $128_1$-$128_n$, herein after referred to as replica reader(s) 128, may each execute on computing device 110. In various embodiments of the present invention, not depicted in FIG. 1, replication sender 132, controller 122, and replica reader(s) 128 may each execute on a plurality of server computers 120 and/or on a plurality of computing devices 110. In some embodiments, replication sender 132, controller 122, and replica reader(s) 128 may each be located and/or executed anywhere within distributed data processing environment 100 as long as replication sender 132, controller 122, and/or replica reader(s) 128 are connected to and/or in communication with, component 121, computing device 110, and/or server computer 120, via network 130.

Figure 2:
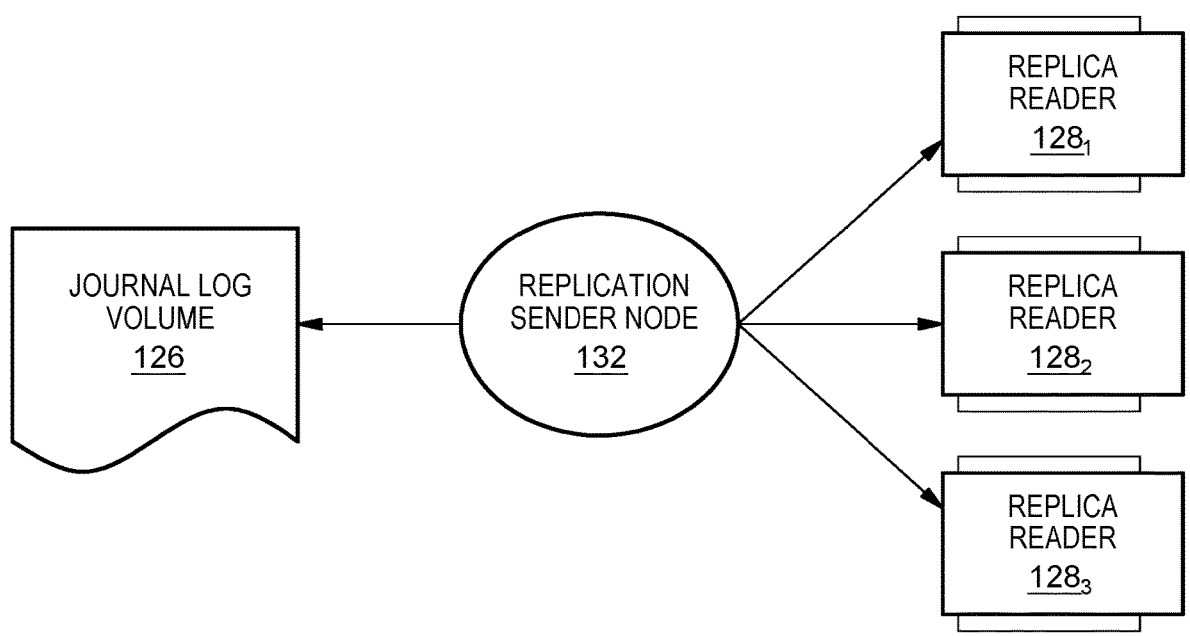
FIG. 2 is a functional block diagram illustrating a replication sender node in a distributed data processing environment, in accordance with an embodiment of the present invention.
Figure 4:
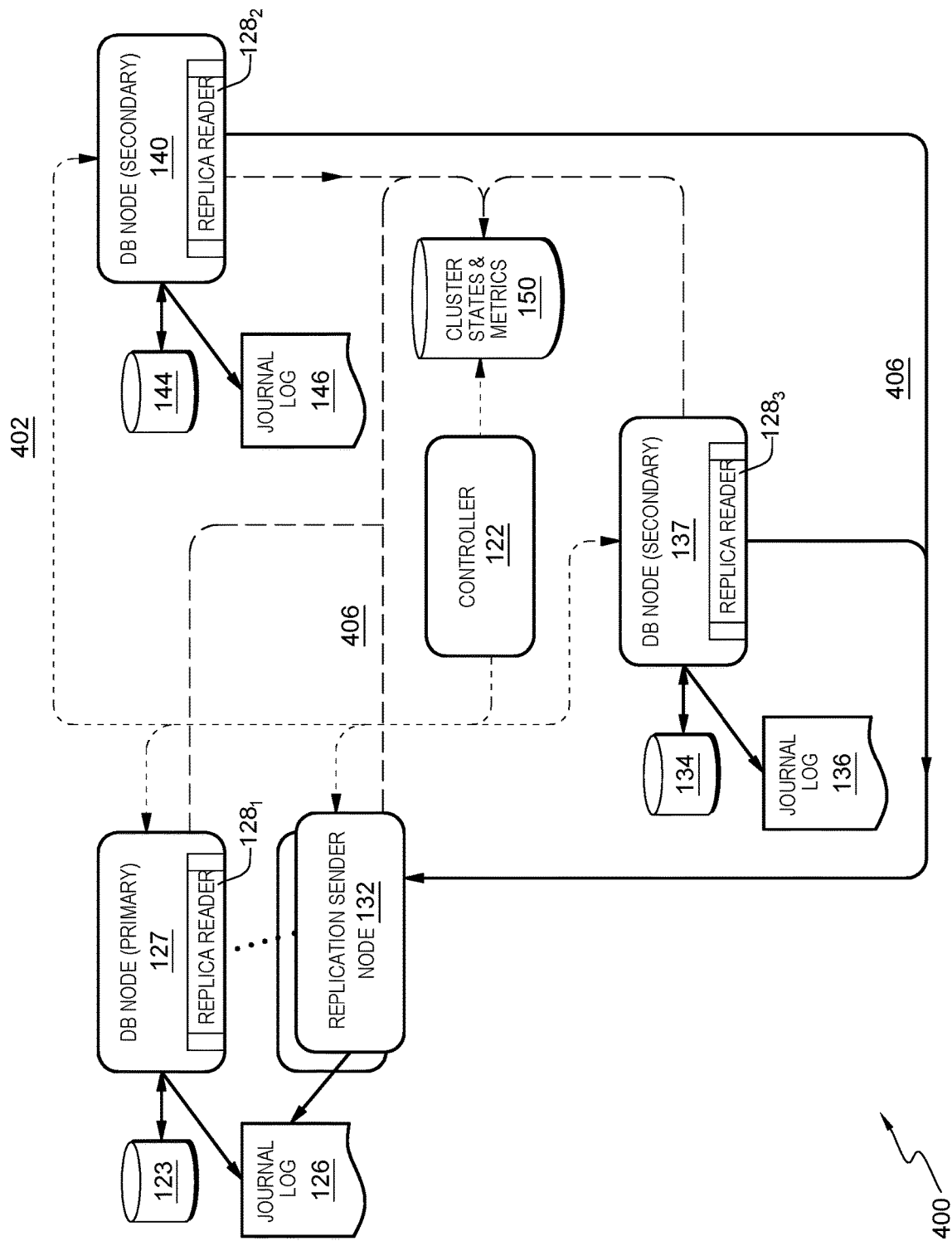
FIG. 4 is a flowchart diagram illustrating communication and dataflow in a distributed data processing environment, in accordance with an embodiment of the present invention.

In various embodiments of the present invention, component 121 improves the art by building and running asynchronous replication logic through database nodes, running as standalone nodes, responsible for data replication from primary database node to secondary database nodes. In various embodiments of the present invention, the standalone node in the cluster is replication sender 132, wherein replication sender 132 has access to journal log volume storage (e.g., journal log 126) mounted to the primary database node (e.g., primary database node (primary) 127) as depicted in FIG. 2 and FIG. 4. In various embodiments of the present invention, the standalone node (e.g., replication sender 132) (i) has its own status, registers and reports status to the controller (e.g., controller 122) and assists in primary database node election, (ii) analyzes replication lags on primary node journal log (e.g., journal log 126) and reports metric to the controller (e.g., controller 122) and (iii) its deployment is controlled by a collector with deployment profile (e.g., HA senders cluster (A-A or A-P)).

In one particular embodiment, as depicted in FIG. 2, replication sender 132 retrieves and/or sends data to and from journal log 126 and replica readers $128_1$-$128_3$. In the embodiment depicted in FIG. 2, three (3) replica readers are shown, however any number of replica readers are possible in other embodiments, as represented by the number n shown in FIG. 1. In various embodiments of the present invention, the standalone node (e.g., replication sender 132) assists in the election of the primary database node based on the collected status information. The collected status information enables replication sender 132 to know the possible traffic workload for replication so that it can assist to decide which node can be next primary database node.

Figure 3:
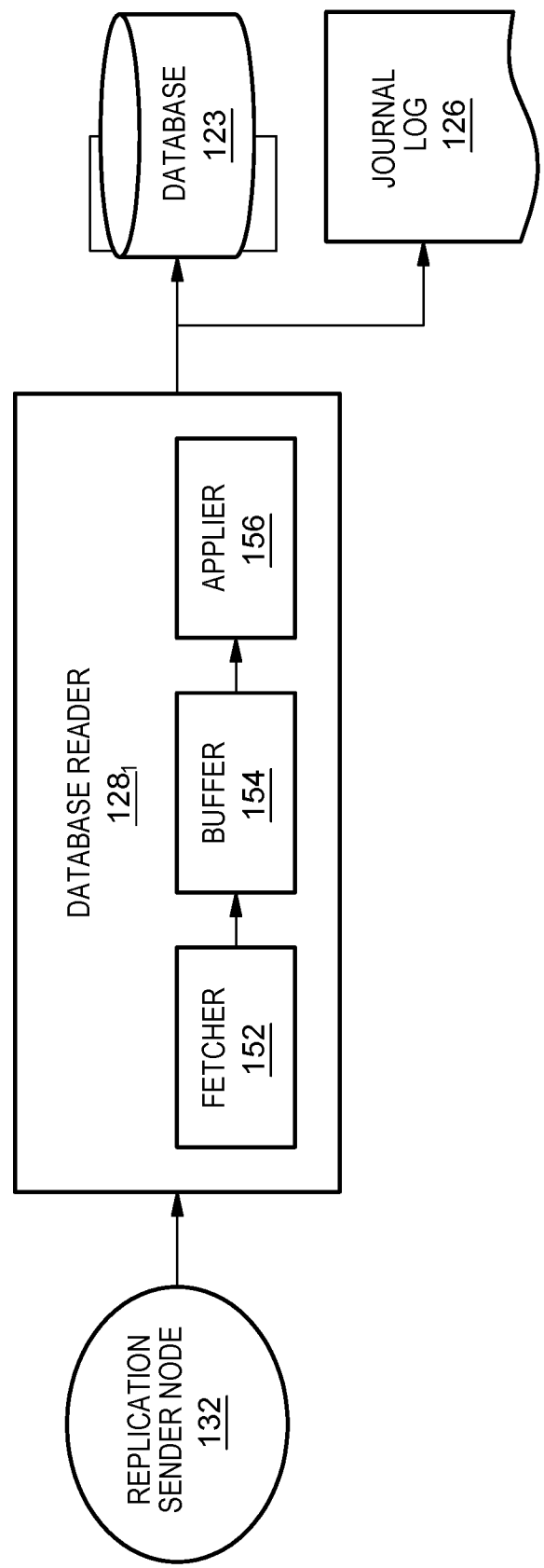
FIG. 3 is a functional block diagram illustrating a database reader in a distributed data processing environment, in accordance with an embodiment of the present invention.

Replica reader(s) 128 are each a single process running on a secondary/standby database node (e.g., secondary database node (secondary) 137 and secondary 140), wherein replica reader(s) 128 may each register to replication sender 132 to replicate journal logs, respectfully, and replay journal log on secondary nodes, similar to FIG. 3. In FIG. 3, replica reader $128_1$ comprises fetcher 152, buffer 154, and applier 156. In this particular embodiment, replica reader $128_1$ registers and receives data from replication sender 132, via fetcher 152, in which the received data is feed to buffer 154. In this particular embodiment, applier 156 receives the data from buffer 154 and reads the received data to properly apply the data execution (e.g., replication or replay), wherein the replication or replay is executed and/or stored via database 123 and/or journal log 126. In various embodiments of the present invention, replica reader(s) 128 each have a fetcher, buffer, and/or applier (e.g., fetcher 152, buffer 154 and/or applier 156.

Cluster Controller 122 may (i) monitor one or more database nodes, sender node status, and control cluster primary database node election, (ii) bring up sender nodes, according to deployment profile, attach to re-primary database node, (iii) monitor replication lag metrics from sender nodes, can scale up/down number of sender nodes with the policy on replication lag, to achieve self-adaptation with replication workload.

FIG. 4 illustrates operational steps of component 121, generally designated 400, in communication with computing device 110, within distributed data processing environment 100 of FIG. 1, for improving asynchronous replication in database clusters, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, control flow 402 comprises, controller 122 reads the status and metrics of the nodes in the cluster (e.g., cluster states and metrics database 150), and generates a replication plan. In various embodiments of the present invention, controller 122 continuously reads the status and metrics of the nodes from cluster and states metrics database 150. In other embodiments of the present invention, controller 122 reads the status and metrics of the nodes from cluster and states metrics database 150 in predetermined intervals. Further, control flow 402 comprises notifying, via controller 122, the replication source and replication target (e.g., primary 127, secondary 137, and secondary 140, respectively) of the replication plan. In various embodiments of the present invention controller 122 instructs the replication source and replication target (e.g., primary 127, secondary 137, and secondary 140, respectively) to be ready to initiate the replication plan. In various embodiments of the present invention, if one or more of replication sources or targets undergo an issue (e.g., fails), then controller 122 will adjust the replication plan to allow the replication to catch up and complete the uncommitted transactions.

In the depicted embodiment, replication data flow 404, comprises replication sender 132 and replica reader(s) 128 receiving one or more notifications from controller 122 comprising a replication plan and replication sender 132 and replica reader(s) 128 communicating and executing the replication plan. Further replication data flow 404 comprises replication sender 132 retrieving journal log 126 from primary database 123 and sending journal log 126 to replication reader(s) 128 on secondary database node 137 and 140. In various embodiments of the present invention, replica reader(s) 128 receive journal log 126 from replication sender 132 and write journal log 126 to its associated journal log (e.g., journal log 136 and 146) which will be written back to database 134 and 144. In various embodiments of the present invention, once primary 127 fails, the data flow will adjust according to the change of primary node and secondary nodes.

In the depicted embodiments, node status and metric report flow 406 comprises primary 127 replication sender 132, and secondary database node 137 and 140 each report their cluster states and metrics to cluster states and metrics database 150, respectively. In various embodiments of the present invention, each primary 127 replication sender 132, and secondary 137 and 140 report their cluster states and metrics to cluster states and metrics database 150 continuously and/or via predetermined intervals.

Figure 5:
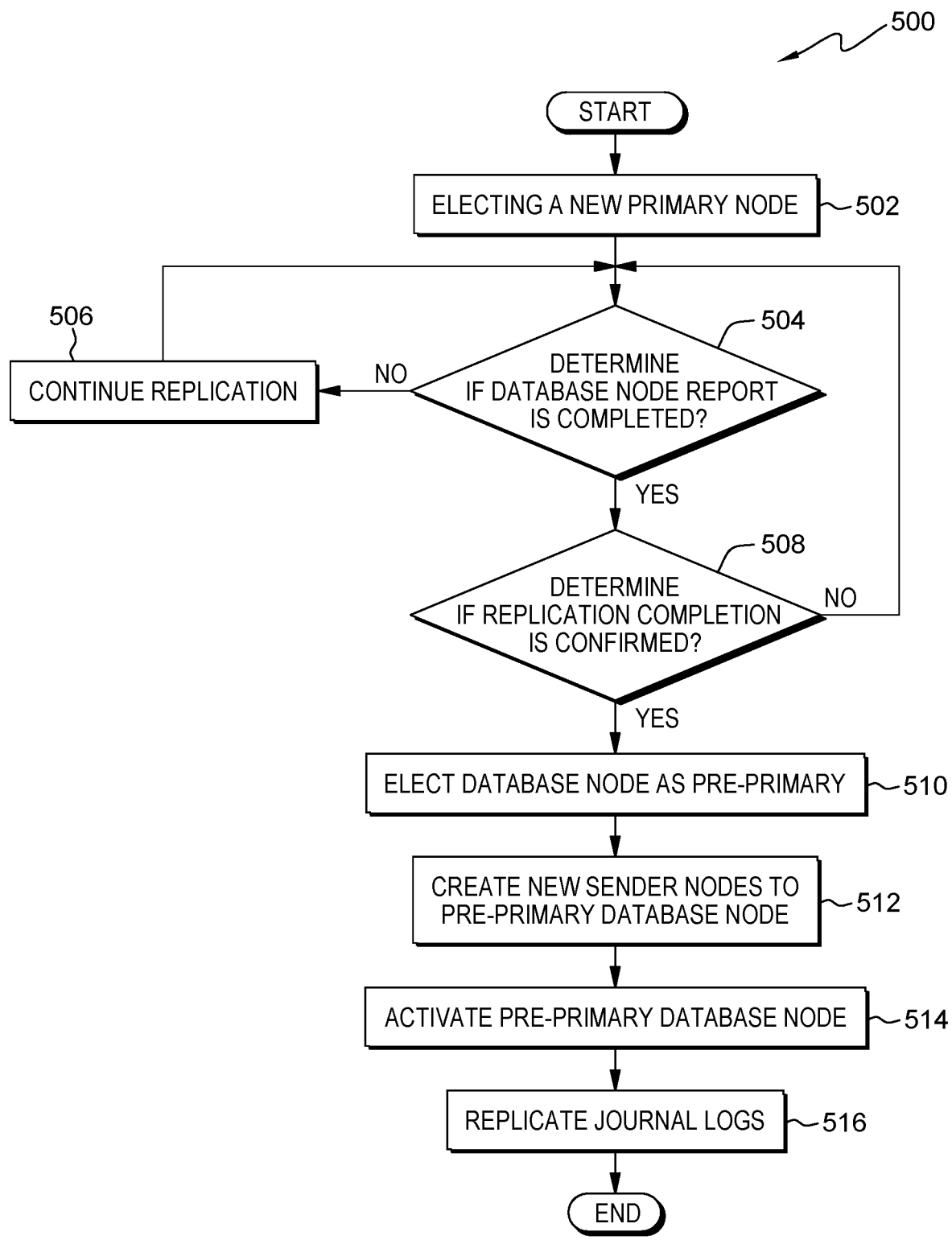
FIG. 5 illustrates operational steps of a database cluster component, on a server computer within the distributed data processing environment of FIG. 1, for improving asynchronous replication in database clusters during primary database node failover, in accordance with an embodiment of the present invention.

FIG. 5 illustrates operational steps of component 121 during primary database node failover, generally designated 500, in communication with computing device 110, within distributed data processing environment 100 of FIG. 1, for improving asynchronous replication in database clusters, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In step 502, component 121 elects a new primary node. In various embodiments of the present invention, if the primary node is down then component 121, via replication sender 132, elects a new primary node from the remaining healthy database nodes in the database cluster.

In step 504, component 121 determines if the database node report is completed. In various embodiments of the present invention, component 121 determines, via sender 132, if database node report indicates replicated journal logs from sender 132 are completed. In various embodiments of the present invention, the database node is still replicating from sender node, and will report its completion when there is no journal log that needs to be replicated. In the depicted embodiment, if component 121 determines that the database node is not complete (No step) then component 121 will continue replicating the journal log (step 506). In the depicted embodiment, if component 121 determines that the database node is complete (Yes step) then component 121 advances to step 508.

In step 506, component 121 continues replication. In various embodiment of the present invention, component 121 continues replicating the journal log from replication sender 132.

In step 508, component 121 determines if replication completion is confirmed. In various embodiments of the present invention, component 121 determines if replication sender 132 confirms the journal logs replicated the database node. In various embodiments of the present invention, component 121 waits for the sender node to confirm completion of the database node replication. In the depicted embodiment, if component 121 determines that the database node replication is not confirmed (No step) then component 121 will return to step 504. In the depicted embodiment, if component 121 determines that the database node completion is complete (Yes step) then component 121 advances to step 510.

In step 510, component 121 elects a database node as a pre-primary node. In various embodiments of the present invention, component 121, via replication sender 132, elects a database node in the database cluster to be the pre-primary node.

In step 512, component 121 creates new sender nodes to the pre-primary database node. In various embodiments of the present invention, component 121, via controller 122, creates new sender nodes to the pre-primary database node according to the deployment profile. The new sender nodes may be configured to access the journal log volume of the current primary database node. In various embodiments of the present invention, controller 122 stops the original sender nodes from operating.

In step 514, component 121 activates the pre-primary database node. In various embodiments of the present invention, component 121 activates the pre-primary database node converting the pre-primary database not into the primary database node and publishes the new replication sender status as "ready."

In step 516, component 121, replicates the journal logs. In various embodiments of the present invention, component 121 instructs the database nodes in the database clusters to register to the new senders to replicate the journal logs.

Figure 6:
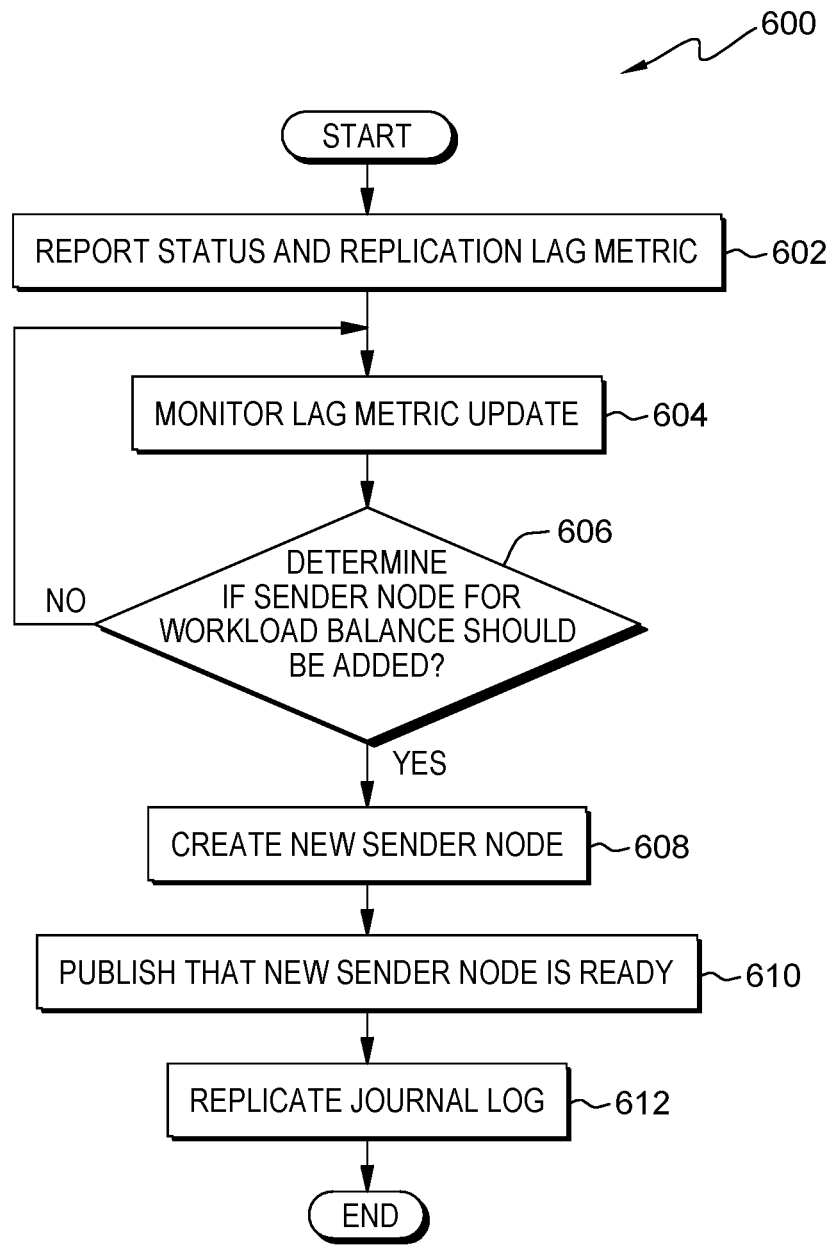
FIG. 6 illustrates operational steps of the database cluster component, on the server computer within the distributed data processing environment of FIG. 1, for improving asynchronous replication in database clusters during sender nodes scaling, in accordance with an embodiment of the present invention.

FIG. 6 illustrates operational steps of component 121 during sender nodes scaling, generally designated 600, in communication with computing device 110, within distributed data processing environment 100 of FIG. 1, for improving asynchronous replication in database clusters, in accordance with an embodiment of the present invention. FIG. 6 provides an illustration of one implementation and does not imply any limitations with regard to the environments in which different embodiments may be implemented. Many modifications to the depicted environment may be made by those skilled in the art without departing from the scope of the invention as recited by the claims.

In step 602, component 121 reports status and replication lag metrics. In various embodiments of the present invention, component 121, via replica sender nodes (e.g., replication sender 132) and database nodes (e.g., database node 137 and 140) report status and replication lag metrics to the primary database node (e.g., primary 127).

In step 604, component 121 monitors lag metric updates. In various embodiments of the present invention, component 121, via controller 122, monitors metric updates by calculating based on policy. For calculating metric updates based on policy for replication sender 132, controller 122 monitors and calculates the number of registered readers, the max replication lag, and the average replication lag. In various embodiments of the present invention, the policy can be defined based different calculation factors.

In step 606, component 121 determines if replication sender 132 for the workload balance should be added. In various embodiments of the present invention, component 121, via replication sender 132 should be added or removed for workload balance. In the depicted embodiment, if component 121 determines replication sender 132 should be removed (No step) then step 604 is repeated. In the depicted embodiment, if component 121 determines replication sender 132 should not be removed (Yes step) then component 121 advances to step 608.

In step 608 component 121 creates a new sender node. In various embodiments of the present invention, component 121, controller 122, creates a new sender node according to deployment profile data and configuration to assess journal log volume of the current primary database node, wherein the new sender node may be configured to assess journal log volume of the current primary database node.

In step 610 component 121 publishes that the new sender node is ready. In various embodiments of the present invention, component 121 publishes the new sender as "ready" in the database cluster, and notifies certain database readers to switch to the new sender. In various embodiments of the present invention, when a new sender node (e.g., replica reader(s) 128) is ready the associated replica reader(s) 128 in the cluster are notified.

In step 612 component 121 replicates the journal logs. In various embodiments of the present invention, component 121 instructs the replica readers (e.g., replication readers $128_1$-$128_3$) to register with the new sender to replicate the journal logs (e.g., journal log 126, 136, and 146).

Figure 7:
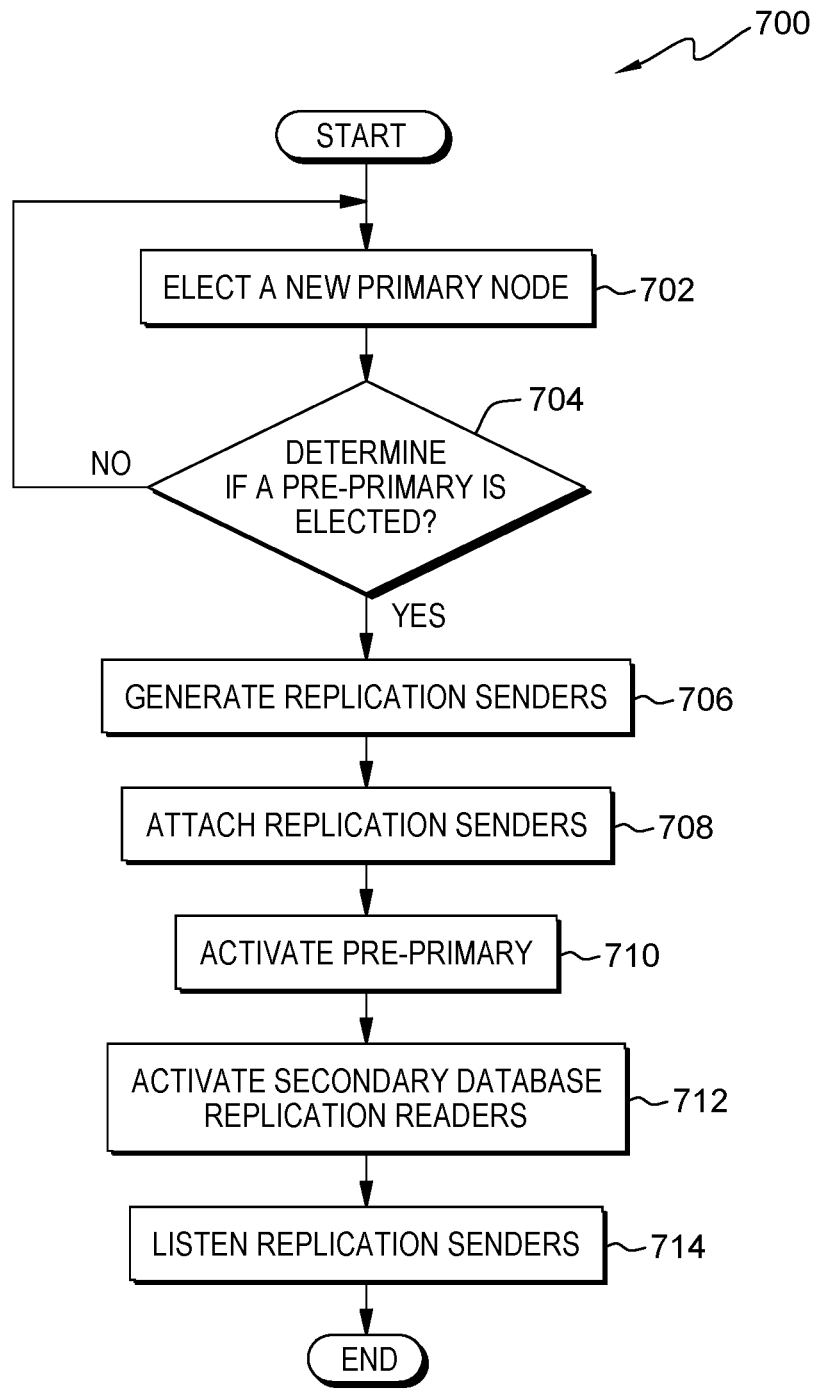
FIG. 7 illustrates operational steps of the database cluster component, on the server computer within the distributed data processing environment of FIG. 1, for improving asynchronous replication in database clusters during cluster startup, in accordance with an embodiment of the present invention.

FIG. 7 illustrates operational steps of component 121 during cluster startup, generally designated 200, in communication with computing device 110, within distributed data processing environment 100 of FIG. 1, for improving asynchronous replication in database clusters, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 702, component 121 elects a new primary node. In various embodiments of the present invention, component 121, via replication sender 132, elects a database node within the database cluster to be the pre-primary node and act as the new primary node when activated. In various embodiments of the present invention, component 121, via controller 122, activates the database nodes in the database clusters according to the deployment profile.

In step 704, component 121 determines if a pre-primary node has been selected. In various embodiments of the present invention, component 121 determines if replica sender 132 has selected a pre-primary node. In the depicted embodiment, if component 121 determines a pre-primary node has not been selected (No step) then component 121 repeats step 702. In the depicted embodiment, if component 121 determines a pre-primary node has been selected (Yes step) then component 121 advances to step 706.

In step 706, component 121 generates replication senders. In various embodiments of the present invention, component 121, via controller 122, generates replication senders.

In step 708, component 121 attaches replication senders to journal log volume. In various embodiments of the present invention, component 121, via controller 122, attaches replication senders to journal log volume of the pre-primary database node.

In step 710, component 121 activates the pre-primary node. In various embodiments of the present invention, component 121, via controller 122, activates the pre-primary database, wherein the activated pre-primary database becomes the primary database node.

In step 712, component 121 activates the secondary database replication readers. In various embodiments of the present invention, component 121 instructs the secondary database nodes (e.g., database node 137 and 140) to activate and initiate replication readers associated with the secondary database nodes (e.g., 138 and 142 respectively).

In step 714, component 121 listens to its related replication sender. In various embodiments of the present invention, component 121, via replication reader $128_1$-$128_3$, listens to the related replication sender.

Figure 8:
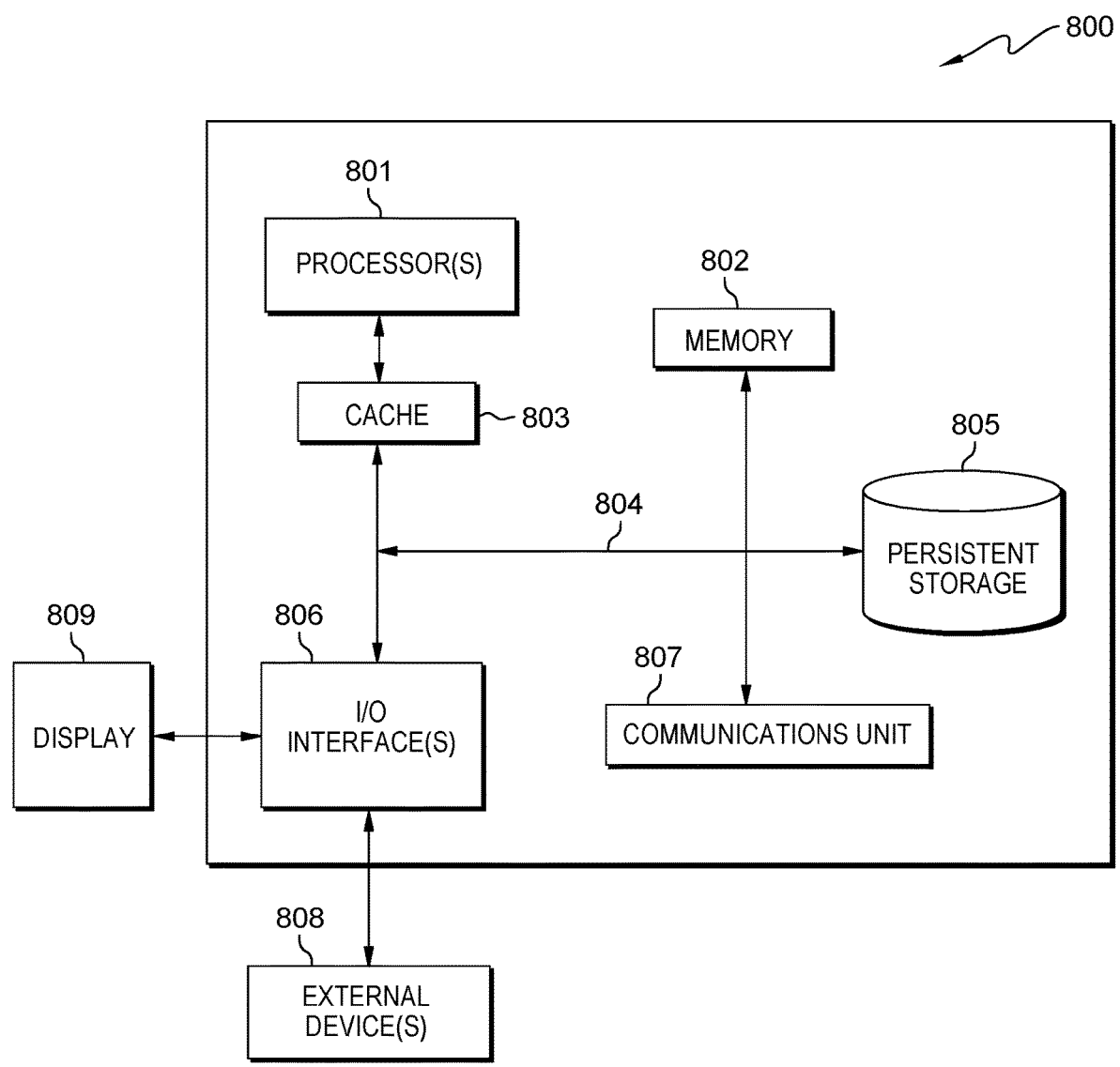
FIG. 8 depicts a block diagram of components of the server computer executing the database cluster component within the distributed data processing environment of FIG. 1, in accordance with an embodiment of the present invention.

FIG. 8 depicts a block diagram of components of server computer 120 within distributed data processing environment 100 of FIG. 1, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

FIG. 8 depicts computer system 800, where server computer 120 represents an example of computer system 800 that includes component 121. The computer system includes processors 801, cache 803, memory 802, persistent storage 805, communications unit 807, input/output (I/O) interface(s) 806, display 809, external device(s) 808 and communications fabric 804. Communications fabric 804 provides communications between cache 803, memory 802, persistent storage 805, communications unit 807, and input/output (I/O) interface(s) 806. Communications fabric 804 may be implemented with any architecture designed for passing data and/or control information between processors (such as microprocessors, communications, and network processors, etc.), system memory, peripheral devices, and any other hardware components within a system. For example, communications fabric 804 may be implemented with one or more buses or a crossbar switch.

Memory 802 and persistent storage 805 are computer readable storage media. In this embodiment, memory 802 includes random access memory (RAM). In general, memory 802 may include any suitable volatile or non-volatile computer readable storage media. Cache 803 is a fast memory that enhances the performance of processors 801 by holding recently accessed data, and data near recently accessed data, from memory 802.

Program instructions and data used to practice embodiments of the present invention may be stored in persistent storage 805 and in memory 802 for execution by one or more of the respective processors 801 via cache 803. In an embodiment, persistent storage 805 includes a magnetic hard disk drive. Alternatively, or in addition to a magnetic hard disk drive, persistent storage 805 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 805 may also be removable. For example, a removable hard drive may be used for persistent storage 805. Other examples include optical and magnetic disks, thumb drives, and smart cards that are inserted into a drive for transfer onto another computer readable storage medium that is also part of persistent storage 805.

Communications unit 807, in these examples, provides for communications with other data processing systems or devices. In these examples, communications unit 807 includes one or more network interface cards. Communications unit 807 may provide communications through the use of either or both physical and wireless communications links. Program instructions and data used to practice embodiments of the present invention may be downloaded to persistent storage 805 through communications unit 807.

I/O interface(s) 806 enables for input and output of data with other devices that may be connected to each computer system. For example, I/O interface 806 may provide a connection to external devices 808 such as a keyboard, keypad, a touch screen, and/or some other suitable input device. External devices 808 may also include portable computer readable storage media such as, for example, thumb drives, portable optical or magnetic disks, and memory cards. Software and data used to practice embodiments of the present invention may be stored on such portable computer readable storage media and may be loaded onto persistent storage 805 via I/O interface(s) 806. I/O interface(s) 806 also connect to display 809.

Display 809 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for retaining committed transactions during database cluster replication, the computer-implemented method comprising:
   building and running asynchronous replication logic using database nodes running as one or more stand-alone nodes, wherein the asynchronous replication logic is responsible for data replication from a primary database node to one or more secondary database nodes;
   registering a replication reader to a sender node to replicate journal logs and replay the journal logs on the one or more secondary database nodes;
   monitoring, by a cluster controller, replication lag metrics from the sender node;
   notifying, by the cluster controller, a replication source and a replication target of a generated replication plan, wherein the cluster controller instructs the replication source and the replication target to be ready to initiate the replication plan; and
   adjusting, by the cluster controller, a replication plan to allow the asynchronous replication logic to catch up and complete uncommitted transactions.

2. The method of claim 1, further comprising:
   reading, by the cluster controller, status and metrics of nodes from a cluster and states metrics database.

3. The method of claim 1, further comprising:
   determining the replication source or target source is undergoing an issue; and
   considering a replication reader as a single process running in secondary/standby node.

4. The method of claim 1, wherein the standalone nodes in the database cluster have their own status and register, and report status to the cluster controller, and wherein the one or more standalone nodes assist primary database node election, and wherein the one or more standalone nodes in the cluster analyzes replication lags on a primary node journal log, reports metrics to the cluster controller, and are deployed by a collector with a deployment profile.

5. The method of claim 1, further comprising:
   generating, by a controller, the replication plan based on the database nodes;
   notifying, by the controller, the replication source and the replication target of the generated replication plan, wherein the controller instructs the replication source and the replication target to be ready to initiate the replication plan.

6. The method of claim 5, further comprising:
   determining the replication source or target source is undergoing an issue.

7. The method of claim 1, wherein the cluster controller is responsible to bring up the sender nodes according to a deployment profile, and attach to a re-primary database node, wherein the cluster controller scales up or down a number of sender nodes with a policy on a replication lag to achieve self-adaptation with a replication workload.

8. A computer system for retaining committed transactions during database cluster replication, the computer system comprising:
one or more computer processors;
one or more computer readable storage devices;
program instructions stored on the one or more computer readable storage devices for execution by at least one of the one or more computer processors, the stored program instructions comprising:
program instructions to build and run asynchronous replication logic using database nodes running as one or more standalone nodes, wherein the asynchronous replication logic is responsible for data replication from a primary database node to one or more secondary database nodes;
program instructions register a replication reader to a sender node to replicate journal logs and replay the journal logs on the one or more secondary database nodes;
program instructions monitor, by a cluster controller, replication lag metrics from the sender node;
program instructions notify, by the cluster controller, a replication source and a replication target of a generated replication plan, wherein the cluster controller instructs the replication source and the replication target to be ready to initiate the replication plan; and
program instructions adjust, by the cluster controller, a replication plan to allow the asynchronous replication logic to catch up and complete uncommitted transactions.

9. The computer system of claim 8, further comprising:
program instructions to read, by the cluster controller, status and metrics of nodes from a cluster and states metrics database.

10. The computer system of claim 8, further comprising:
program instructions to determine the replication source or target source is undergoing an issue; and
program instructions to consider a replication reader as a single process running in secondary/standby node.

11. The computer system of claim 8, wherein the standalone nodes in the database cluster have their own status and register, and report status to the cluster controller, and wherein the one or more standalone nodes assist primary database node election, and wherein the one or more standalone nodes in the cluster analyzes replication lags on a primary node journal log, reports metrics to the cluster controller, and are deployed by a collector with a deployment profile.

12. The computer system of claim 8, further comprising:
program instructions to generate, by a controller, the replication plan based on the database nodes;
program instructions to notify, by the controller, the replication source and the replication target of the generated replication plan, wherein the controller instructs the replication source and the replication target to be ready to initiate the replication plan.

13. The computer system of claim 12, further comprising:
program instructions to determine the replication source or target source is undergoing an issue.

14. The computer system of claim 8, wherein the cluster controller is responsible to bring up the sender nodes according to a deployment profile, and attach to a re-primary database node, wherein the cluster controller scales up or down a number of sender nodes with a policy on a replication lag to achieve self-adaptation with a replication workload.

15. A computer program product for retaining committed transactions during database cluster replication, the computer program product comprising:
one or more computer readable storage devices and program instructions stored on the one or more computer readable storage devices, the stored program instructions comprising:
program instructions to build and run asynchronous replication logic using database nodes running as one or more standalone nodes, wherein the asynchronous replication logic is responsible for data replication from a primary database node to one or more secondary database nodes;
program instructions register a replication reader to a sender node to replicate journal logs and replay the journal logs on the one or more secondary database nodes;
program instructions monitor, by a cluster controller, replication lag metrics from the sender node;
program instructions notify, by the cluster controller, a replication source and a replication target of a generated replication plan, wherein the cluster controller instructs the replication source and the replication target to be ready to initiate the replication plan; and
program instructions adjust, by the cluster controller, a replication plan to allow the asynchronous replication logic to catch up and complete uncommitted transactions.

16. The computer program product of claim 15, further comprising:
program instructions to read, by the cluster controller, status and metrics of nodes from a cluster and states metrics database.

17. The computer program product of claim 15, further comprising:
program instructions to determine the replication source or target source is undergoing an issue; and
program instructions to consider a replication reader as a single process running in secondary/standby node.

18. The computer program product of claim 15, wherein the standalone nodes in the database cluster have their own status and register, and report status to the cluster controller, and wherein the one or more standalone nodes assist primary database node election, and wherein the one or more standalone nodes in the cluster analyzes replication lags on a primary node journal log, reports metrics to the cluster controller, and are deployed by a collector with a deployment profile.

19. The computer program product of claim 15, further comprising:
program instructions to generate, by a controller, the replication plan based on the database nodes;
program instructions to notify, by the controller, the replication source and the replication target of the generated replication plan, wherein the controller instructs the replication source and the replication target to be ready to initiate the replication plan; and
program instructions to determine the replication source or target source is undergoing an issue.

20. The computer program product of claim 15, wherein the cluster controller is responsible to bring up the sender nodes according to a deployment profile, and attach to a re-primary database node, wherein the cluster controller scales up or down a number of sender nodes with a policy on a replication lag to achieve self-adaptation with a replication workload.

* * * * *